United States Patent [19]

Garwood et al.

[11] 4,376,036

[45] Mar. 8, 1983

[54] PRODUCTION OF HIGH V. I. LUBRICATING OIL STOCK

[75] Inventors: William E. Garwood, Haddonfield; Paul G. Rodewald, Rocky Hill; Nai Y. Chen, Titusville, all of N.J.

[73] Assignee: Mobil Oil Corporation, New York, N.Y.

[21] Appl. No.: 241,319

[22] Filed: Mar. 6, 1981

[51] Int. Cl.³ .............................................. C10G 47/16
[52] U.S. Cl. .................................... 208/111; 208/120
[58] Field of Search ......................................... 208/111

[56] References Cited

U.S. PATENT DOCUMENTS

| | | | |
|---|---|---|---|
| 3,267,022 | 8/1966 | Hansford | 208/111 |
| 3,352,796 | 11/1967 | Kimberlin | 208/111 |
| 3,668,113 | 6/1972 | Burbidge et al. | 208/97 |
| 3,698,157 | 10/1972 | Allen et al. | 585/825 |
| 3,980,586 | 9/1976 | Mitchell | 252/455 Z |
| 4,060,568 | 11/1977 | Rodewald | 585/640 |
| 4,100,219 | 7/1978 | Rodewald | 585/640 |
| 4,148,713 | 4/1979 | Rollmann | 208/111 |
| 4,247,388 | 1/1981 | Banta et al. | 208/111 |

*Primary Examiner*—Delbert E. Gantz
*Assistant Examiner*—O. Chaudhuri
*Attorney, Agent, or Firm*—Charles A. Huggett; Michael G. Gilman; Charles J. Speciale

[57] ABSTRACT

A process for the manufacture of high quality lubricating oils having a high viscosity index and low pour point is disclosed which comprises catalytically dewaxing a lubricating oil stock by contacting the same in the presence of hydrogen over a zeolite such as ZSM-5 which has been silica-modified.

11 Claims, No Drawings

PRODUCTION OF HIGH V. I. LUBRICATING OIL STOCK

BACKGROUND OF THE INVENTION

1. Field of the Invention

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude oils of high wax content. This invention is particularly directed to catalytically dewaxing a waxy distillate lubricating oil with a silica-modified ZSM-5 type zeolite catalyst to obtain a lubricating oil of low pour point and of high V.I.

2. Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structures and structure types. This complexity and its consequences are referred to in "Petroleum Refinery Engineering", by W. L. Nelson, McGraw-Hill Book Company, Inc., New York, New York, 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having somewhat different properties. Or, the refined lubricant stock, prior to use as a lubricant, may be compounded with one or more additives which function, for example, as antioxidants, extreme pressure additives, and V.I. improvers. As used herein, the term "stock", regardless whether or not the term is further qualified, will refer only to a hydrocarbon oil without additives. The term "raw stock" will be used herein to refer to a viscous distillate fraction of crude petroleum oil isolated by vacuum distillation of a reduced crude from atmospheric distillation, and before further processing, or its equivalent. The term "solvent-refined stock" will refer to an oil that has been solvent refined, for example, with furfural. The term "dewaxed stock" will refer to an oil which has been treated by any method to remove or otherwise convert the wax contained therein and thereby reduce its pour point. The term "waxy", as used herein will refer to an oil of sufficient wax content to result in a pour point greater than +20° F. The term "stock", when unqualified, will be used herein generically to refer to the viscous fraction in any stage of refining, but in all cases free of additives.

Briefly, for the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, or chlorex, which is selective for aromatic hydrocarbons, and which removes undesirable components. The raffinate from solvent refining is then dewaxed, for example, by admixing with a solvent such as a blend of methyl ethyl ketone and toluene. The mixture is chilled to induce crystallization of the paraffin waxes which are then separated from the dewaxed dissolved raffinate in quantity sufficient to provide the desired pour point for the subsequently recovered raffinate.

Other processes such as hydrofinishing or clay percolation may be used if needed to reduce the nitrogen and sulfur content or improve the color of the lubricating oil stock.

Viscosity Index (V.I.) is a quality parameter of considerable importance for distillate lubricating oils to be used in automotive engines and aircraft engines which are subject to wide variations in temperature. This Index is a series of numbers ranging from 0 to 100 which indicate the rate of change of viscosity with temperature. A viscosity index of 100 indicates an oil that does not tend to become viscous at low temperature or become thin at high temperatures. Measurement of the Saybolt Universal Viscosity of an oil at 100 and 210° F., and referral to correlations, provides a measure of the V.I. of the oil. For purposes of the present invention, whenever V.I. is referred to, it is meant the V.I. as noted in the Viscosity Index tabulations of the ASTM (D567), published by ASTM, 1916 Race Street, Philadelphia, Pa., or equivalent.

To prepare high V.I. automotive and aircraft oils the refiner usually selects a crude oil relatively rich in paraffinic hydrocarbons, since experience has shown that crudes poor in paraffins, such as those commonly termed "naphthene-base" crudes yield little or no refined stock having a V.I. above about 40. (See Nelson, supra, pages 80–81 for classifications of crude oils). Suitable stocks for high V.I. oils, however, also contain substantial quantities of waxes which result in solvent-refined lubricating oil stocks of high pour point, i.e. a pour point substantially greater than +20° F. Thus, in general, the refining of crude oil to prepare acceptable high V.I. distillate stocks ordinarily includes dewaxing to reduce the pour point to not greater than +20° F. The refiner, in this step, often produces saleable paraffin wax by-product, thus in part defraying the high cost of the dewaxing step.

Raw distillate lubricating oil stocks usually do not have a particularly high V.I. However, solvent-refining, as with furfural for example, in addition to removing unstable and sludge-forming components from the crude distillate, also removes components which adversely affect the V.I. Thus, a solvent refined stock prior to dewaxing usually has a V.I. well in excess of specifications. Dewaxing, on the other hand, removes paraffins which have a V.I. of about 200, and thus reduces the V.I. of the dewaxed stock.

In recent years catalytic techniques have become available for dewaxing of petroleum stocks. A process of that nature developed by British Petroleum is described in The Oil and Gas Journal dated Jan. 6, 1975, at pages 69-73. See also U.S. Pat. No. 3,668,113.

In reissue U.S. Pat. No. 28,398 to Chen, et al is described a process for catalytic dewaxing with a catalyst comprising zeolite ZSM-5. Such processes combined with catalytic hydrofinishing is described in U.S. Pat. No. 3,894,938. In U.S. Pat. No. 3,755,138 to Chen et al is described a process for mild solvent dewaxing to remove high quality wax from a lube stock, which is then catalytically dewaxed to specification pour point. The entire contents of these patents are herein incorporated by reference.

It is interesting to note that catalytic dewaxing, unlike prior art dewaxing processes, although subtractive, is not a physical process, but rather, depends on transforming the straight chain and other waxy paraffins to non-wax materials. The process, however, is more economical and thus of industrial interest, even though at least some loss of saleable wax is inherent. Commercial interest in catalytic dewaxing is evidence of the need for more efficient refinery processes to produce low pour point lubricants.

It is an object of this invention to provide a process of improved selectivity for catalytically dewaxing a hydrocarbon oil boiling within the range of 450° to 1050° F. It is another object of this invention to provide a method for removing paraffin waxes from a lubricating oil stock with reduced loss of V.I. These and other objects will become apparent to one skilled in the art on reading this entire specification including the claims appended hereto.

BRIEF DESCRIPTION OF THE INVENTION

It has now been found that catalytic dewaxing of a distillate petroleum fraction characterized by a pour point of greater than +20° F. is advantageously achieved by utilizing as catalyst the hereinbelow described silica-modified ZSM-5 type zeolite under process conditions more particularly described hereinbelow. The recovered dewaxed oil so produced has a V.I. measurably higher than that obtained with conventional or unmodified ZSM-5 catalyst. In a particularly preferred embodiment, the silica-modified ZSM-5 zeolite is in the hydrogen form and is employed (with or without an added hydrogenation component such as platinum or palladium) in the presence of hydrogen.

DETAILED DESCRIPTION OF THE INVENTION

In the description which follows, particular reference will be made to the preparation of hydrocarbon lubricating oil stocks from suitable crude petroleum fractions. A suitable crude petroleum, for purposes of this invention, is one from which may be prepared (i.e., contains) a dewaxed lubricating oil having a V.I. of at least about 85, and a pour point not greater than +20° F., by conventional methods of distillation, solvent refining and dewaxing. Also contemplated as within the scope of this invention for use as feed thereto is any hydrocarbon lubricating oil stock boiling within the range of from about 450°, and preferably from about 600° to about 1050° F., and capable of yielding significant amounts of dewaxed lubricating oil having a V.I. of at least about 85 and a pour point not greater than +20° F. Thus, hydrocracked petroleum oils having the foregoing characteristics are included within the scope of this invention, as well as are other processed heavy oils whether derived from tar sands, coal, or from other sources. The boiling points herein referred to are boiling points at atmospheric pressure, and may be determined by vacuum assay in the manner known to those skilled in the art.

In a preferred embodiment of this invention, the raw stock hereinabove described is solvent refined by countercurrent extraction with at least an equal volume (100 vol. %) of a selective solvent such as furfural. It is preferred to use 1.5 to 2.5 volumes of solvent per volume of oil. The raffinate is subjected to catalytic dewaxing by mixing with hydrogen and contacting at 500° to about 800° F. with said silica-modified ZSM-5 type zeolite in an alumina binder. The catalytic dewaxing is conducted at a liquid hourly space velocity (LHSV) of 0.1 to 5.0 volumes of charge oil per volume of catalyst per hour.

In some instances it may be desirable to partially dewax the solvent-refined stock by conventional solvent dewaxing techniques, say to a pour point from 10° to about 50° F., and preferably to a pour point greater than about +20° F., prior to catalytic dewaxing. The higher melting point waxes so removed are those of greater hardness and higher market value than the waxes removed in taking the product to a still lower pour point.

The cracked fragments from cracking wax molecules in the catalytic dewaxer will have adverse effects on flash and fire points of the product and preferably are therefore removed by distillation of the product to flash and fire point specifications.

The catalytic dewaxing step of this invention may be conducted by contacting the feed to be dewaxed with a fixed stationary bed of catalyst, with a fixed fluidized bed, or with a transport bed, as desired. Typical operation conditions include temperatures of from about 500° to 800° F., and more preferably from 550° to 750° F. The pressure can range from 200 to 3000 psig, although pressures of 400 to 1000 psig are preferred. Hydrogen can range from 500 to 10,000 SCF/bbl.

The silica-modified ZSM-5 type catalyst utilized herein is known in the art and is disclosed in various U.S. patents, including U.S. Pat. Nos. 4,090,981; 4,127,616, 4,060,568; 4,100,219; 3,682,966; 3,698,157 and 3,980,586, the disclosures of which are incorporated by reference.

These catalysts are prepared by reacting a ZSM-5 type zeolite and/or said zeolite containing an alumina binder with selected organic silicone compounds and/or organic silanes. As is obvious from said patents, the silica modification can be of two general types. Thus, the ZSM-5 type zeolite can be treated with a compound or compounds capable of entering the internal pore structure of the zeolite such that at least a portion of the silica is interdispersed within the interior crystalline structure of the zeolite while the remainder is on the surface of the zeolite and in and/or on the alumina binder, e.g. see U.S. Pat. No. 4,100,219. On the other hand, the ZSM-5 type zeolite can be treated as a compound or compounds of sufficiently large molecular diameter such that the silica is substantially excluded from the interior of the zeolite and is present on the external surface of the zeolite and in and/or on the alumina, e.g. see U.S. Pat. No. 4,090,981. It is within the scope of this invention to use either or both of the above general techniques and the expression "silica-modified" is intended to mean the addition of from 0.1 to about 30 weight percent silica and more preferably from 2 to 20 weight percent silica (based on the zeolite) plus alumina binder irrespective of whether the silica is inside, outside or both inside and outside the zeolite crystal.

The catalytic composition of this invention comprises a crystalline aluminosilicate zeolite characterized by a silica to alumina ratio of at least about 12, preferably in excess of 30, and a constraint index within the approximate range of 1 to 12.

The zeolites herein described are members of a novel class of zeolites exhibiting some unusual properties. These zeolites induce profound transformations of aliphatic hydrocarbons to aromatic hydrocarbons in commercially desirable yields and are generally highly effective in conversion reactions involving aromatic hydrocarbons. Although they have unusually low alumina contents, i.e. high silica to alumina ratios, they are very active even when the silica to alumina ratio exceeds 30. This activity is surprising since catalytic activity is generally attributed to framework aluminum atoms and cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate; the oxygen atoms themselves being bonded to the silicon or aluminum atoms at the centers of the tetrahedra. Briefly, the preferred type catalysts useful in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Likewise, this ratio excludes silica added in accordance with the present invention, to the crystalline aluminosilicate zeolite after its formation. Although catalysts with a silica to alumina ratio of at least 12 are useful, it is preferred to use catalysts having higher ratios of at least about 30. Such catalyst, after activation, acquires an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a small sample, approximately 1 gram or less, of zeolite at atmospheric pressure according to the following procedure. A sample of the zeolite in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at 1 liquid hourly space velocity (i.e. 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for the present invention are those having a constraint index in the approximate range of 1 to 12. Constraint Index (CI) values for some typical catalysts are:

| CAS | C.I. |
| --- | --- |
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |
| Beta | 0.6 |
| ZSM-4 | 0.5 |
| H—zeolon | 0.5 |
| REY | 0.4 |
| Amorphous Silica-Alumina | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 500° F. to 950° F., with accompanying conversion between 10% and 60%, the constraint index may vary within the indicated approximate range of 1 to 12. Likewise, other variables such as the crystal size of the zeolite, the presence of possibly occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. to 950° F., the constraint index will have a value for any given zeolite of interest herein within the approximate range of 1 to 12.

The class of zeolites defined herein is exemplified by ZSM-5, ZSM-11, ZSM-12, ZSM-35, ZSM-38 and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-38 is more particularly described in U.S. application Ser. No. 528,060, filed Nov. 29, 1974. This zeolite can be identified, in terms of mole ratios of oxides and in the anhydrous state, as follows:

$$(0.3-2.5)R_2O: (0-0.8)M_2O: Al_2O_3: 8\ SiO_2$$

wherein R is an organic nitrogen-containing cation derived from a 2-(hydroxyalkyl) trialkylammonium compound and M is an alkali metal cation, and is characterized by a specified x-ray powder diffraction pattern.

In a preferred synthesized form, the zeolite has a formula, in terms of mole ratios of oxides and in the anhydrous state, as follows:

$$(0.4-2.5)R_2O: (0-0.6)M_2O:Al_2O_3:xSiO_2$$

wherein R is an organic nitrogen-containing cation derived from a 2-(hydroxyalkyl) trialkylammonium compound, wherein alkyl is methyl, ethyl or a combination thereof, M is an alkali metal, especially sodium, and x is from greater than 8 to about 50.

The synthetic ZSM-38 zeolite possesses a definite distinguishing crystalline structure whose x-ray diffraction pattern shows substantially the significant lines set forth in Table I. It is observed that this x-ray diffraction pattern (significant lines) is similar to that of natural ferrierite with a notable exception being that natural ferrierite patterns exhibit a significant line at 11.33 Å.

TABLE 1

| d(Å) | I/Io |
|---|---|
| 9.8 ± 0.20 | Strong |
| 9.1 ± 0.19 | Medium |

TABLE 1-continued

| d(Å) | I/Io |
|---|---|
| 8.0 ± 0.16 | Weak |
| 7.1 ± 0.14 | Medium |
| 6.7 ± 0.14 | Medium |
| 6.0 ± 0.12 | Weak |
| 4.37 ± 0.09 | Weak |
| 4.23 ± 0.09 | Weak |
| 4.01 ± 0.08 | Very Strong |
| 3.81 ± 0.08 | Very Strong |
| 3.69 ± 0.07 | Medium |
| 3.57 ± 0.07 | Very Strong |
| 3.51 ± 0.07 | Very Strong |
| 3.34 ± 0.07 | Medium |
| 3.17 ± 0.06 | Strong |
| 3.08 ± 0.06 | Medium |
| 3.00 ± 0.06 | Weak |
| 2.92 ± 0.06 | Medium |
| 2.73 ± 0.06 | Weak |
| 2.66 ± 0.05 | Weak |
| 2.60 ± 0.05 | Weak |
| 2.49 ± 0.05 | weak |

A further characteristic of ZSM-38 is its sorptive capacity providing said zeolite to have increased capacity for 2-methylpentane (with respect to n-hexane sorption by the ratio n-hexane/2-methyl-pentane) when compared with a hydrogen form of natural ferrierite resulting from calcination of an ammonium exchanged form. The characteristic sorption ratio n-hexane/2-methylpentane for ZSM-38 (after calcination at 600° C.) is less than 10, whereas that ratio for the natural ferrierite is substantially greater than 10, for example, as high as 34 or higher.

Zeolite ZSM-38 can be suitably prepared by preparing a solution containing sources of an alkali metal oxide, preferably sodium oxide, an organic nitrogen-containing oxide, an oxide of aluminum, an oxide of silicon and water and having a composition, in terms of mole ratios of oxides, falling within the following ranges:

| R+ | Broad | Preferred |
|---|---|---|
| R+ + M+ | 0.2–1.0 | 0.3–0.9 |
| OH−/SiO₂ | 0.05–0.5 | 0.07–0.49 |
| H₂O/OH− | 41–500 | 100–250 |
| SiO₂/Al₂O₃ | 8.8–200 | 12–60 | wherein R is an organic nitrogen-containing cation derived from a 2-(hydroxyalkyl) trialkylammonium compound and M is an alkali metal ion, and maintaining the mixture until crystals of the zeolite are formed. (The quantity of OH− is calculated only from the inorganic sources of alkali without any organic base contribution). Thereafter, the crystals are separated from the liquid and recovered. Typical reaction conditions consist of heating the foregoing reaction mixture to a temperature of from about 90° C. to about 400° C. for a period of time of from about 6 hours to about 100 days. A more preferred temperature range is from about 150° C. to about 400° C. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is thereafter dried, e.g. at 230° F. for from about 8 to 24 hours.

ZSM-35 is more particularly described in U.S. application Ser. No. 528,061, filed Nov. 29, 1974. This zeolite can be identified, in terms of mole ratios of oxides and in the anhydrous state, as follows:

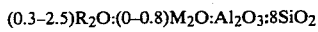

(0.3–2.5)R$_2$O:(0–0.8)M$_2$O:Al$_2$O$_3$:8SiO$_2$ wherein R is an organic nitrogen-containing cation derived from ethylenediamine or pyrrolidine and M is an alkali metal cation, and is characterized by a specific x-ray powder diffraction pattern.

In a preferred synthesized form, the zeolite has formula, in terms of mole ratios of oxides and in the anhydrous state, as follows:

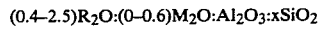

(0.4–2.5)R$_2$O:(0–0.6)M$_2$O:Al$_2$O$_3$:xSiO$_2$ wherein R is an organic nitrogen-containing cation derived from ethylenediamine or pyrrolidine, M is an alkali metal, especially sodium, and x is from greater than 8 to about 50.

The synthetic ZSM-35 zeolite possesses a definite distinguishing crystalline structure whose x-ray diffraction pattern shows substantially the significant lines set forth in Table II. It is observed that this x-ray diffraction pattern (with respect to significant lines) is similar to that of natural ferrierite with a notable exception being that natural ferrierite patterns exhibit a significant line at 11.33 Å. Close examination of some individual samples of ZSM-35 may show a very weak line at 11.3–11.5 Å. This very weak line, however, is determined not to be a significant line for ZSM-35.

TABLE II

| d(Å) | I/Io |
|---|---|
| 9.6 ± 0.20 | Very Strong, Very very strong |
| 7.10 ± 0.15 | Medium |
| 6.98 ± 0.14 | Medium |
| 6.64 ± 0.14 | Medium |
| 5.78 ± 0.12 | Weak |
| 5.68 ± 0.12 | Weak |
| 4.97 ± 0.10 | Weak |
| 4.58 ± 0.09 | Weak |
| 3.99 ± 0.08 | Strong |
| 3.94 ± 0.08 | Medium Strong |
| 3.85 ± 0.08 | Medium |
| 3.78 ± 0.08 | Strong |
| 3.74 ± 0.08 | Weak |
| 3.66 ± 0.07 | Medium |
| 3.54 ± 0.07 | Very Strong |
| 3.48 ± 0.07 | Very Strong |
| 3.39 ± 0.07 | Weak |
| 3.32 ± 0.07 | Weak Medium |
| 3.14 ± 0.06 | Weak Medium |
| 2.90 ± 0.06 | Weak |
| 2.85 ± 0.06 | Weak |
| 2.71 ± 0.05 | Weak |
| 2.65 ± 0.05 | Weak |
| 2.62 ± 0.05 | Weak |
| 2.58 ± 0.05 | Weak |
| 2.54 ± 0.05 | Weak |
| 2.48 ± 0.05 | Weak |

A further characteristic of zSM-35 is its sorptive capacity proving said zeolite to have increased capacity for 2-methylpentane (with respect to n-hexane sorption by the ratio n-hexane/2-methylpentane) when compared with a hydrogen form of natural ferrierite resulting from calcination of an ammonium exchanged form. The characteristic sorption ratio n-hexane/2-methylpentane for ZSM-35 (after calcination at 600° C.) is less than 10, whereas that ratio for the natural ferrierite is substantially greater than 10, for example, as high as 34 or higher.

Zeolite ZSM-35 can be suitably prepared by preparation of a solution containing sources of an alkali metal oxide, preferably sodium oxide, an organic nitrogen-containing oxide, an oxide of aluminum, an oxide of silicon and water and having a composition, in terms of mole ratios of oxides, falling with the following ranges:

| | Broad | Preferred |
|---|---|---|
| R+ | | |
| R+ + M+ | 0.2–1.0 | 0.3–0.9 |
| OH$^-$/SiO | 0.05–0.5 | 0.07–0.49 |
| H$_2$O/OH$^-$ | 41–500 | 100–250 |
| SiO$_2$/Al$_2$O$_3$ | 8.8–200 | 12–60 | wherein R is an organic nitrogen-containing cation derived from pyrrolidine or ethylenediamine and M is an alkali metal ion, and maintaining the mixture until crystals of the zeolite are formed. (The quantity of OH$^-$ is calculated only from the inorganic sources of alkali without any organic base contribution). Thereafter, the crystals are separated from the liquid and recovered. Typical reaction conditions consist of heating the foregoing reaction mixture to a temperature of from about 90° C. to about 400° C. for a period of time of from about 6 hours to about 100 days. A more preferred temperature range is from about 150° C. to about 400° C. with the amount of time at a temperature in such range being from about 6 hours to about 80 days.

The digestion of the gel particles is carried out until crystals form. The solid product is separated from the reaction medium, as by cooling the whole to room temperature, filtering and water washing. The crystalline product is dried, e.g. at 230° F., for from about 8 to 24 hours.

The specific zeolites described, when prepared in the presence of organic cations, are catalytically inactive, possibly because the intracrystalline free space is occupied by organic cations from the forming solution. They may be activated by heating in an inert atmosphere at 1000° F. for 1 hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-38 and ZSM-35, with ZSM-5 particularly preferred.

The catalysts of this invention may be in the hydrogen form or they may be base exchanged or impregnated to contain ammonium or a metal cation complement. It is desirable to calcine the catalyst after base exchange. The metal cations that may be present include any of the cations of the metals of Groups I through VIII of the Periodic Table. However, in the case of Group IA metals, the cation content should in no case be so large as to effectively inactivate the catalyst.

In a preferred aspect of this invention, the catalysts hereof are selected as those having a crystal framework density, in the dry hydrogen form, of not substantially below about 1.6 grams per cubic centimeter. The preferred catalysts of this invention are those having a constraint index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5,-11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabizite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups IB to VIII of the Periodic Table including, by way of example, nickel, zinc, calcium or rare earth metals.

The ZSM-5 type zeolite is then composited with 5 to 95 weight percent of an alumina binder and silica-modified as previously mentioned. It is possible to silica-modify the zeolite and then incorporate it in an alumina binder which, in turn, can be silica-modified but such is not preferred.

The expression alumina binder is intended to include alumina as well as silica alumina, kaolin, etc.

The following examples will illustrate the novel process of this invention. In all cases, the feed stock was a heavy neutral raffinate which was furfural extracted having the following properties:

| | |
|---|---|
| Gravity, °API | 29.1 |
| Gravity, Specific | 0.8811 |
| Pour Point, °F. | >115 |
| KV at 210° F., cs | 9.91 |
| Distillation (ASTM D1160) | |
| IBP, °F. | 678 |
| 5 | 851 |
| 10 | 870 |
| 30 | 885 |
| 50 | 908 |
| 70 | 925 |
| 90 | 950 |
| 95 | 960 |

All the catalysts, unless otherwise noted, were in extrudate form, containing 35% alumina binder. All runs were made at 400 psig.

EXAMPLE 1

This example will illustrate the use of a conventional HZSM-5 which has not been silica-modified.

| | HZSM-5 | | | | |
|---|---|---|---|---|---|
| Av. Cat. Temp., °F. | 601 | 654 | 701 | 753 | 752 |
| LHSV | ← | ← | 1 | → | 0.4 |
| $H_2$, SCF/bbl | ← | ← | 2500 | → | 6250 |
| Run Time, hours | 22.5 | 23.5 | 22.5 | 23 | 26.5 |
| Time on Stream, days | 1.9 | 2.9 | 3.8 | 4.8 | 5.9 |
| Material Balance, wt % | 102.4 | 103.4 | 102.3 | 102.5 | 108.6 |
| Yields, wt % (NLB) | | | | | |
| $C_1 + C_2$ | 0.3 | 0.6 | 1.4 | 2.7 | 3.9 |
| $C_3$ | 5.7 | 7.7 | 8.0 | 9.8 | 17.1 |
| $C_4$ | 6.4 | 6.8 | 6.8 | 9.0 | 15.4 |
| $C_5$ | 2.2 | 2.2 | 2.2 | 1.9 | 3.3 |
| $C_6$-420° F. | 1.5 | 0.7 | 1.2 | 1.4 | 2.2 |
| 420–650° F. | 1.2 | 2.0 | 0.9 | 1.9 | 2.5 |
| 650° F.+ | 82.9 | 80.0 | 79.5 | 73.3 | 55.6 |
| 650° F.+ Lube Properties | | | | | |
| Gravity, °API | 28.2 | 28.4 | 27.7 | 27.6 | 27.4 |
| Gravity, Specific | 0.8860 | 0.8849 | 0.8888 | 0.8894 | 0.8905 |
| Pour Point, °F. | +40 | +35 | +20 | +5 | −25 |
| KV @ 100° F., cs | 114.5 | 119.4 | 119.5 | 110.3 | 99.47 |
| KV @ 210° F., cs | 11.30 | 11.67 | 11.63 | 10.97 | 10.08 |
| Viscosity Index | 91.9 | 92.6 | 91.8 | 90.9 | 87.6 |

EXAMPLE 2

The procedure of Example 1 was substantially repeated with the exception that a silica-modified HZSM-5 zeolite in an alumina binder was used. The silica was deposited on the HZSM-5 crystals as described in U.S. Pat. No. 4,100,219, first contacting the NH$_4$ zeolite with methylhydrogen-silicone dissolved in n-hexane, distilling off the solvent from a rotating flask, heating the residue for one hour in an oil bath at 100° C. and finally calcining in air at 1° C./min to 538° C., then seven hours at 538° C. The final catalyst contained 13.6% silica added in this manner.

The results obtained as well as additional operating conditions are listed in the following table:

| Silica-Modified HZSM-5 | | | |
|---|---|---|---|
| Av. Cat. Temp., °F. | 653 | 654 | 753 |
| LHSV | 1 | 0.4 | 0.4 |
| H$_2$, SCF/bbl | 2500 | 6250 | 6250 |
| Run Time, hours | 23.5 | 24.5 | 43 |
| Time on Stream, days | 2.7 | 3.7 | 5.5 |
| Material Balance, wt % | 102.2 | 101.4 | 101.1 |
| Yields, wt % (NLB) | | | |
| C$_1$ + C$_2$ | 0.1 | 0.1 | 0.8 |
| C$_3$ | 1.4 | 2.3 | 4.6 |
| C$_4$ | 2.8 | 3.0 | 9.8 |
| C$_5$ | 2.2 | 2.1 | 6.2 |
| C$_6$-420° F. | 4.8 | 3.8 | 14.1 |
| 420-650° F. | 0.5 | 0.2 | 8.2 |
| 650° F.+ | 88.2 | 88.5 | 56.3 |
| 650° F.+ Lube Oil Properties | | | |
| Gravity, °API | 28.8 | 28.2 | 29.5 |
| Gravity, Specific | 0.8827 | 0.8860 | 0.8789 |
| Pour Point, °F. | +50 | +40 | +20 |
| KV @ 100° F., cs | 105.4 | 106.9 | 78.15 |
| KV @ 210° F., cs | 11.10 | 11.13 | 9.30 |
| Viscosity Index | 98.6 | 97.4 | 103.8 |

The V.I.'s from the runs at 650° F. are significantly higher than those of Example 1 using HZSM-5 alone. Yield of 650° F.+ lube product at a given pour point is also higher. This is interpreted as resulting from a higher selectivity for high pour waxy paraffins. Activity is lower, due to the deposited intracrystalline silica. More severe conditions were required to get the same pour point, as summarized below.

| | Comparison at +20° F. Pour | |
|---|---|---|
| | HZSM-5 | Silica-Modified HZSM-5 |
| Temperature, °F. | 701 | 753 |
| LHSV | 1 | 0.4 |
| H$_2$, SCF/bbl | 2500 | 6250 |
| 650° F.+ Lube | | |
| Yield, wt % | 79.5 | 56.3 |
| KV @ 100° F., cs | 119.5 | 78.15 |
| KV @ 210° F., cs | 11.63 | 9.30 |
| Viscosity Index | 91.8 | 103.8 |

The yield at 650° F.+ lube product is 23 weight percent lower at the more severe conditions, but the V.I., 12 units higher. The 104 V.I. is above that of 100 obtained by conventional solvent dewaxing of this stock.

EXAMPLE 3

The procedure of Example 2 was repeated except that the silica-modified HZSM-5 was prepared with phenylmethyl silicone—a molecule too large to enter the internal pore structure of the zeolite. This catalyst was prepared in accordance with Example 1 of U.S. Pat. No. 4,090,981 and contained 14 weight percent external silica.

The results obtained, as well as additional operating conditions, are shown below:

| Catalyst, 14% External Silica (via Phenylmethyl Silicone) on HZSM-5 Extrudate (35% Alumina Binder) Conditions 400 psig, 1 LHSV, 2500 SCF H$_2$/bbl | | | | |
|---|---|---|---|---|
| Av. Catalyst Temp., °F. | 599 | 652 | 700 | 753 |
| Run Time, Hrs | 21 | 21 | 25 | 22 |
| Time on Stream, Days | 0.9 | 1.8 | 2.8 | 3.7 |
| Material Balance, Wt. % | 97.1 | 98.6 | — | 95.7 |
| Yields, Wt. % (NLB) | | | | |
| C$_1$ + C$_2$ | 0.2 | 0.5 | * | 1.8 |
| C$_3$ | 4.8 | 6.3 | * | 7.8 |
| C$_4$ | 5.1 | 5.1 | * | 6.6 |
| C$_5$ | 1.9 | 1.4 | * | 2.2 |
| C$_6$-650° F. | 2.7 | 1.9 | * | 6.6 |
| 650° F.+ | 85.3 | 84.8 | * | 75.0 |
| 650° F.+ Lube Properties | | | | |
| Gravity, °API | 29.0 | 29.0 | 28.9 | 29.1 |
| Gravity, Specific | 0.8816 | 0.8816 | 0.8822 | 0.8811 |
| Pour Point, °F. | +45 | +50 | +45 | +30 |
| KV @ 100° F., cs | 104.1 | 109.1 | 105.4 | 89.10 |
| KV @ 210° F., cs | 11.01 | 11.29 | 93.69 | 10.04 |
| Viscosity Index | 98.5 | 97.5 | 98.0 | 101.0 |

*Gaseous product lost during run.

As can be seen, results are very similar to those obtained with intracrystalline silica (Example 2). V.I. is higher than when HZSM-5 alone is used (Example 1), and the binder effect giving still higher V.I. occurs at 750° F.

EXAMPLE 4

This example will show the results of testing when a silica-modified HZSM-5 is used with no binder.

| Catalyst, 7% External Silica (via Phenylmethyl Silicone) on HZSM-5, No Binder Conditions 400 psig, 1 LHSV, 2500 SCF H$_2$/bbl | | | | |
|---|---|---|---|---|
| Av. Catalyst Temp., °F. | 600 | 651 | 700 | 751 |
| Run Time, Hrs | 18 | 22½ | 23 | 24 |
| Time on Stream, Days | 0.7 | 1.6 | 2.5 | 3.5 |
| Material Balance, Wt. % | 97.7 | 95.5 | 98.7 | 98.0 |
| Yields, Wt. % (NLB) | | | | |
| C$_1$ + C$_2$ | 1.1 | 0.9 | 2.0 | 4.9 |
| C$_3$ | 7.3 | 6.6 | 8.7 | 10.5 |
| C$_4$ | 2.9 | 3.4 | 4.7 | 3.6 |
| C$_5$ | 0.8 | 0.8 | 0.7 | 0.4 |
| C$_6$-650° F. | 2.0 | 1.8 | 1.6 | 3.5 |
| 650° F.+ | 85.9 | 86.5 | 82.3 | 77.1 |
| 650° F.+ Lube Properties | | | | |
| Gravity, °API | 28.7 | 28.5 | 28.5 | 28.4 |
| Gravity, Specific | 0.8833 | 0.8844 | 0.8844 | 0.8849 |
| Pour Point, °F. | +45 | +45 | +45 | +35 |
| KV @ 100° F., cs | 112.0 | 113.9 | 114.4 | 108.0 |
| KV @ 210° F., cs | 11.43 | 11.52 | 11.50 | 11.05 |
| Viscosity Index | 96.4 | 95.8 | 95.0 | 94.9 |

V.I. is again higher than when HZSM-5 alone is used. However, in the absence of binder, the added boost does not occur at 750° F.

What is claimed is:

1. In a process for catalytically hydrodewaxing a lubricating oil stock containing high pour point waxy paraffins by contacting the same in the presence of added hydrogen at elevated temperatures and pressures with a catalyst composition comprising a binder and a crystalline aluminosilicate zeolite having a silica to alumina ratio of at least about 12 and a constraint index within the approximate range of 1 to 12, the improvement which comprises carrying out said hydrodewaxing with said zeolite which has been silica-modified by the addition of at least 0.1% by weight silica to said catalyst from the reaction of said catalyst with silicones or silanes so as to enhance the selectivity of the catalyst for said high pour waxy paraffins and recovering a product having an enhanced viscosity index.

2. The process of claim 1 wherein said silica-modified zeolite contains a substantial portion of the silica on the external surface thereof.

3. The process of claim 1 wherein said silica-modified zeolite has a portion of said silica within its interior crystalline structure.

4. The process of claim 2 wherein said zeolite is in the hydrogen form.

5. The process of claim 3 wherein said zeolite is in the hydrogen form.

6. The process of claim 4 wherein said silica-modified zeolite is HZSM-5.

7. The process of claim 4 wherein said silica-modified zeolite is HZSM-11.

8. The process of claim 4 wherein said silica-modified zeolite is HZSM-12.

9. The process of claim 5 wherein said silica-modified zeolite is HZSM-5.

10. The process of claim 5 wherein said silica-modified zeolite is HZSM-11.

11. The process of claim 5 wherein said silica-modified zeolite is HZSM-12.

* * * * *